United States Patent [19]

Tappe et al.

[11] Patent Number: 5,243,034
[45] Date of Patent: Sep. 7, 1993

[54] DISAZO DYESTUFFS HAVING A TRIAZINE MOIETY AND A FIBERREACTIVE GROUP OF VINYLSULFONE SERIES

[75] Inventors: Horst Tappe, Dietzenbach; Dieter Oehme, Flörsheim am Main; Holger M. Büch; Werner H. Russ, both of Hofheim am Taunus, all of Fed. Rep. of Germany

[73] Assignee: Hoechst Aktiengesellschaft, Frankfurt am Main, Fed. Rep. of Germany

[21] Appl. No.: 794,688

[22] Filed: Nov. 18, 1991

Related U.S. Application Data

[63] Continuation of Ser. No. 452,728, Dec. 19, 1989, abandoned.

[30] Foreign Application Priority Data

Dec. 21, 1988 [DE] Fed. Rep. of Germany ....... 3843014

[51] Int. Cl.$^5$ .................. C09B 62/513; C09B 62/09; D06P 1/38
[52] U.S. Cl. .................... 534/637; 534/635; 534/636
[58] Field of Search .............. 534/635, 636, 637, 644, 534/642

[56] References Cited

U.S. PATENT DOCUMENTS

| | | | |
|---|---|---|---|
| 4,622,390 | 11/1986 | Meininger et al. | 534/634 |
| 4,754,023 | 6/1988 | Tzikas et al. | 534/637 X |
| 4,766,206 | 8/1988 | Tzikas | 534/637 X |
| 4,845,203 | 7/1989 | Dietz et al. | 534/637 |
| 4,908,436 | 3/1990 | Scheibli | 534/635 X |

FOREIGN PATENT DOCUMENTS

| | | | |
|---|---|---|---|
| 76782 | 4/1983 | European Pat. Off. | 534/638 |
| 0094055 | 11/1983 | European Pat. Off. | |
| 63-105065 | 5/1988 | Japan | 534/637 |
| 1576237 | 10/1980 | United Kingdom | |

Primary Examiner—Mary C. Lee
Assistant Examiner—Fiona T. Powers

[57] ABSTRACT

Disazo dyestuffs containing sulfo groups and having fiber-reactive properties, which are capable of dyeing materials containing hydroxyl groups and/or carboxamide groups, in particular fiber materials, such as synthetic polyamide fibers, wool and in particular cellulose fiber materials, in deep fast shades. They contain a group corresponding to the formula

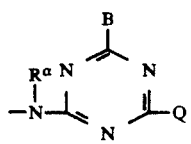

in which $R^a$ is hydrogen or alkyl having 1 to 4 carbon atoms, which can be substituted by carboxyl, sulfo, cyano, hydroxyl or chlorine;

B is fluorine, chlorine, bromine, lower alkylsulfonyl, phenylsulfonyl, methoxy or sulfo;

Q is a group of the formula

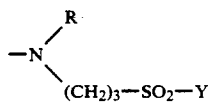

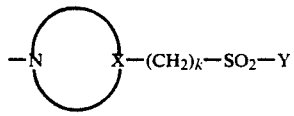

in which

Y is vinyl, β-sulfatoethyl, β-halogenoethyl, β-thiosulfatoethyl, β-phosphatoethyl or β-acetoxyethyl, R is hydrogen or lower alkyl, k is the number zero to 4 and X, together with the N atom, forms the bivalent radical of a heterocyclic ring which optionally contains additional hetero atoms.

14 Claims, No Drawings

DISAZO DYESTUFFS HAVING A TRIAZINE MOIETY AND A FIBERREACTIVE GROUP OF VINYLSULFONE SERIES

This application is a continuation of our copending application Ser. No. 07/452,728, filed Dec. 19, 1989, now abandoned.

The invention relates to the technical field of fiber-reactive dyestuffs.

The practice of dyeing using reactive dyestuffs has recently led to greater demands on the quality of the dyeings and the economy of the dyeing process. Although a large number of reactive dyestuffs are already known, such as, for example, from European Patent Application Publications Nos. 0,048,355A, 0,094,055A, 0,141,367A and 0,144,766A, there is still a need for new reactive dyestuffs which have improved properties, in particular in respect of application. Dyeing of cotton by the cold pad-batch process now requires reactive dyestuffs which have a substantivity suitable for the low dyeing temperature and at the same time show easy washing out of the non-fixed portions. They should furthermore have a high reactivity, so that only short batch times are needed, and they should produce in particular dyeings of high degrees of fixing. These requirements are met only inadequately by known dyestuffs, such as are described, for example, in European Patent No. 0,076,782 B1.

The present invention was therefore based on the object of discovering novel, improved reactive dyestuffs. They should be distinguished above all by high fixing yields, high fiber-dyestuff bond stabilities, easy washing out of the non-fixed portions and a low sensitivity towards dyeing parameters, such as dyeing time and dyeing temperatures in the range from 40° to 80° C.

This object has been achieved with the present invention by the discovery of dyestuffs which correspond to the general formula (1)

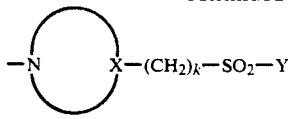

In this formula:

A is the radical of a disazo dyestuff containing at least one sulfo group;

$R^\alpha$ is a hydrogen atom or a straight-chain or branched alkyl group having 1 to 4 carbon atoms, which can be substituted by a carboxy, sulfo, cyano or hydroxy group or by a chlorine atom, preferably methyl and ethyl and particularly preferably a hydrogen atom;

B is fluorine, chlorine, bromine, alkylsulfonyl having 1 to 4 carbon atoms, phenylsulfonyl, methoxy or sulfo, preferably fluorine or chlorine;

Q is a group of the general formula (2a) or (2b)

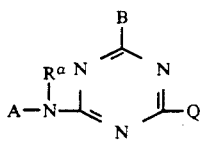

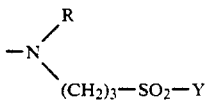

in which

Y is the vinyl group or a β-sulfatoethyl or β-halogenoethyl, such as β-chloroethyl or β-bromoethyl, or a β-thiosulfatoethyl, β-phosphatoethyl or β-acetoxyethyl group, preferably a vinyl group or particularly preferably a β-chloroethyl group or β-sulfatoethyl group, R is a hydrogen atom or an alkyl group having 1 to 4 carbon atoms, k represents the number zero, 1, 2, 3 or 4 and X together with the N atom and 1 or 2 alkylene groups having 1 to 5 carbon atoms, and optionally 1 or 2 hetero atoms, such as nitrogen and oxygen atoms, form the bivalent radical of a heterocyclic ring, such as, for example, the piperazin-1,4-ylene or a pioeridinylene radical.

The dyestuff radical A preferably contains 2 to 6, in particular 2 to 4, sulfo groups.

In addition to hydrogen and methyl, $R^\alpha$ denotes, in particular, ethyl, 1-propyl, 2-propyl, 1-butyl, 2-methyl-1-propyl, tert.-butyl, carboxymethyl, sulfomethyl, β-sulfoethyl, β-cyanoethyl, β-chloropropyl or β-hydroxyethyl.

R is preferably the methyl or ethyl group, and particularly preferably a hydrogen atom.

The substituents "sulfo", "carboxy", "phosphato", "thiosulfato" and "sulfato" include both the acid form thereof and the salt form thereof. Accordingly, sulfo groups denote groups corresponding to the general formula —SO₃M, carboxy groups denote groups corresponding to the general formula —COOM, phosphato groups denote groups corresponding to the general formula —OPO₃M₂, thiosulfato groups denote groups corresponding to the general formula —S—SO₃M and sulfato groups denote groups corresponding to the general formula —OSO₃M, in which M is a hydrogen atom or preferably an alkali metal, such as sodium, potassium or lithium.

Dyestuffs according to the invention corresponding to the general formula (1) are, in particular, those disazo dyestuffs which correspond to the general formulae (3a) or (3b)

$$Y-SO_2-X^1-D-N=N-E-N=N-K-Z \qquad (3a)$$

$$Z-D-N=N-E-N=N-K-X^1-SO_2-Y \qquad (3b)$$

in which, in these formulae, the individual formula members have the following meanings:

Y has one of the abovementioned meanings,

X¹ is a direct bond or a bridge member, such as, for example, an alkylene group having 1 to 4 carbon atoms or the bivalent radical of an alkanoylamido group having 2 to 5 carbon atoms, Z is a group of the general formula (4)

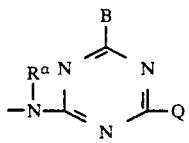 (4)

in which $R^a$, B and Q have one of the abovementioned meanings,

D is the radical of a diazo component from the benzene or naphthalene series which is customary in azo chemistry and can contain substituents customary for azo dyestuffs, such as, for example, sulfo, carboxy, hydroxy, amino, methyl, ethyl, methoxy and ethoxy groups and optionally substituted alkanoylamino groups having 2 to 4 carbon atoms, optionally substituted benzoylamino groups and halogen atoms, K is the radical of a coupling component of the benzene, naphthalene, pyrazolone, 6-hydroxy-2pyridone or acetoacetic acid arylamide series which is customary in azo chemistry, it being possible for the coupling component to contain the substituents customary for azo dyestuffs, such as, for example, sulfo, carboxy, hydroxy, amino, methyl, ethyl, methoxy and ethoxy groups and optionally substituted alkanoylamino groups having 2 to 4 carbon atoms, optionally substituted benzoylamino groups and halogen atoms, such as chlorine and bromine, and E is the radical of a middle component of the benzene or naphthalene series which is customary in disazo dyestuffs and can be substituted by substituents customary for azo dyestuffs, such as, for example, sulfo, carboxy, hydroxy, methyl, ethyl, methoxy and ethoxy groups and optionally substituted alkanoylamino groups having 2 to 4 carbon atoms, optionally substituted ureido groups, optionally substituted benzoylamino groups and halogen atoms, the radicals D, E and K together containing at least two sulfo groups, preferably 3 to 4 sulfo groups.

Of the dyestuffs according to the invention, those which are furthermore to be singled out are those which correspond to the general formula (3c)

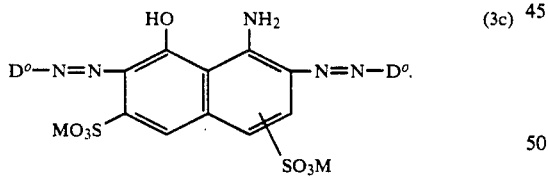

Of the disazo dyestuffs of the general formulae (3) according to the invention, those which are particularly worth mentioning are those which correspond to the general formulae (5a), (5b) and (5c)

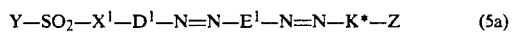 (5a)

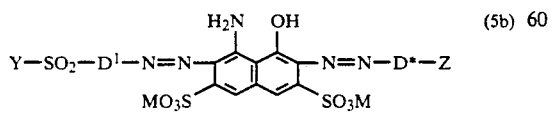 (5b)

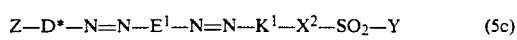 (5c)

those of the formulae (5a) and (5b) being preferred.

In these formulae:

Y, M and Z have one of the abovementioned meanings;

$X^1$ has one of the abovementioned meanings and is preferably a group of the formula —(CH$_2$)$_3$—CO—NH—, and particularly preferably a direct bond;

$X^2$ has one of the meanings given for $X^1$ and is preferably a group of the formula —NH—CO—(CH$_2$)$_3$—, and particularly preferably a direct bond;

$D^0$ is a radical of the general formula (6a), (6b) or (6c)

 (6a)

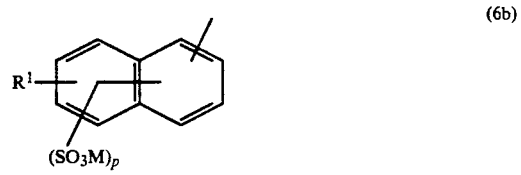 (6b)

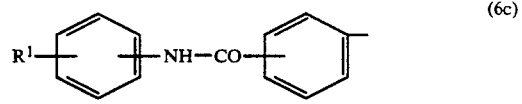 (6c)

in which $R^1$ in the one radical $D^0$ represents one or two groups of the abovementioned defined general formula —$X^1$—SO$_2$—Y, in which —$X^1$— has one of the above-mentioned particularly preferred meanings, and $R^1$ in the other $D^0$ denotes a radical Z of the general formula (4), $R^2$ is hydrogen, methyl, ethyl, methoxy, ethoxy, alkanoyl having 2 to 5 carbon atoms, such as acetyl or propionyl, cyano, carboxy, sulfo, alkoxycarbonyl having 2 to 5 carbon atoms, carbamoyl, N-(C$_1$-C$_4$-alkyl)-carbamoyl, fluorine, chlorine, bromine or trifluoromethyl, $R^3$ is hydrogen, methyl, ethyl, methoxy, ethoxy, cyano, carboxy, sulfo, alkanoylamino having 2 to 5 carbon atoms, such as acetylamino, alkoxycarbonyl having 2 to 5 carbon atoms, carbamoyl, N-(C$_1$-C$_4$-alkyl)-carbamoyl, fluorine, chlorine, nitro, sulfamoyl, N-(C$_1$-C$_4$-alkyl)sulfamoyl, alkylsulfonyl having 1 to 4 carbon atoms, phenylsulfonyl or phenoxy, p denotes the number zero, 1 or 2 (this group denoting a hydrogen atom in the case where p is zero) and M has the abovementioned meaning;

$D^1$ is a phenylene radical which contains the above-mentioned defined substituents $R^2$ and $R^3$, or is a naphthylene radical which can be substituted by 1 or 2 sulfo groups;

$E^1$ is a radical of the general formula (7a), (7b), (7c) or (7d)

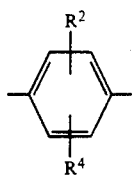 (7a)

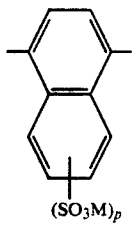 (7b)

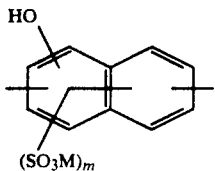 (7c)

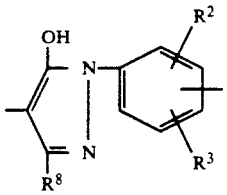 (7d)

in which $R^2$, $R^3$, M and p have the abovementioned meanings, $R^4$ is a hydrogen atom, an alkyl group having 1 to 4 carbon atoms, such as the methyl or ethyl group, an alkoxy group having 1 to 4 carbon atoms, such as the methoxy or ethoxy group, a chlorine atom, an alkanoylamino group having 2 to 5 carbon atoms, such as the acetylamino or propionylamino group, the benzoylamino group, the ureido group, an N'-phenyl-ureido group, an N'-alkyl-ureido group having 1 to 4 carbon atoms in the alkyl radical, a phenylsulfonyl group or an alkylsulfonyl group having 1 to 4 carbon atoms, m denotes the number 1 or 2 and $R^8$ has one of the meanings given below;

—K*—Z is a radical of the general formula (8a), (8b), (8c), (8d), (8e) or (8f)

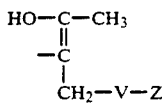 (8a)

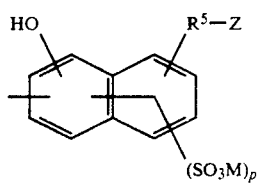 (8b)

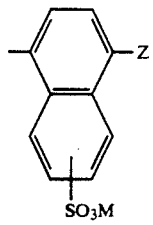 (8c)

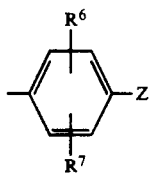 (8d)

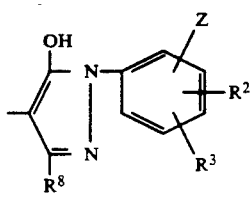 (8e)

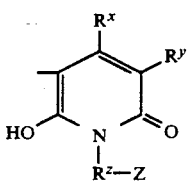 (8f)

in which $R^1$, $R^2$, $R^3$, Z, p and M have the abovementioned meanings and the hydroxy group in formula (8b) is in the ortho-position relative to the free bond bonded to the azo group, V is a phenylene radical, which contains the abovementioned defined radicals $R^2$ and $R^3$, or is a naphthylene radical which can be substituted by 1 or 2 sulfo groups, $R^5$ is a direct bond or a radical of the formula —NH—CO—phenylene—, —NH—CO—NH—phenylene—, —N(CH$_3$)—CO—phenylene— or —N(CH$_3$)—CO—NH—phenylene—, $R^6$ is hydrogen, alkyl having 1 to 4 carbon atoms, such as methyl or ethyl, alkoxy having 1 to 4 carbon atoms, such as methoxy or ethoxy, bromine, chlorine or alkanoylamino having 2 to 7 carbon atoms, such as acetylamino or propionylamino, $R^7$ is hydrogen, alkyl having 1 to 4 carbon atoms, such as methyl or ethyl, alkoxy having 1 to 4 carbon atoms, such as methoxy or ethoxy, chlorine or alkanoylamino having 2 to 7 carbon atoms, such as acetylamino or propionylamino, or a ureido or phenylureido group, $R^8$ represents hydrogen, alkyl having 1 to 4 carbon atoms, such as methyl, cyano, carboxy, carbalkoxy having 2 to 5 carbon atoms, carboxamido or phenyl, but is preferably methyl, carboxy or carbalkoxy having 2 to 5 carbon atoms, such as carbomethoxy or carbethoxy, $R^x$ is a hydrogen atom or an alkyl group having 1 to 4 carbon atoms, such as the methyl group, or an alkyl group having 1 to 4 carbon atoms which is substituted by alkoxy having 1 to 4 carbon atoms such as methoxy, or by cyano, $R^y$ is a hydrogen atom, a sulfo group or a sulfoalkyl group with an alkylene radical having 1 to 4 carbon atoms, such as the sulfomethyl group, or a cyano or carbamoyl group and $R^z$ is an alkylene group having 1 to 6 carbon atoms, preferably 1 to 4 carbon atoms, or a phenylene radical, which can be substituted by substituents from the group comprising methyl, ethyl, chlorine, carboxy and sulfo, or is an alkylenephenylene radical having 2 to 4 carbon atoms in the alkylene radical;

D* is a phenylene radical, which can be substituted by 1 or 2 substituents from the group comprising hydrogen, methyl, ethyl, methoxy, bromine, chlorine, carboxy and sulfo, or is a naphthylene radical, which can be substituted by 1 or 2 sulfo groups; and $K^1$ is a radical of the general formula (9a), (9b) or (9c)

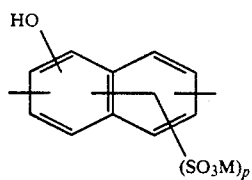

(9a)

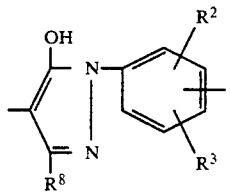

(9b)

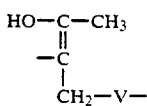

(9c)

in which M, p, V, $R^2$, $R^3$ and $R^8$ have the abovementioned meanings and the hydroxy group in formula (9a) is in the ortho-position relative to the free bond bonded to the azo group.

In the abovementioned compounds of the formulae (3) and (5), the radical Z preferably denotes a group —NH—$Z^1$, in which $Z^1$ is a group of the general formula (4a)

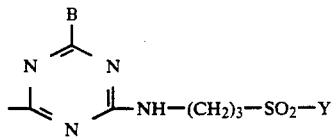

(4a)

in which B and Y have the abovementioned particularly preferred meanings.

Dyestuffs according to the invention which are particularly preferred are those corresponding to the general formulae (10) and (11)

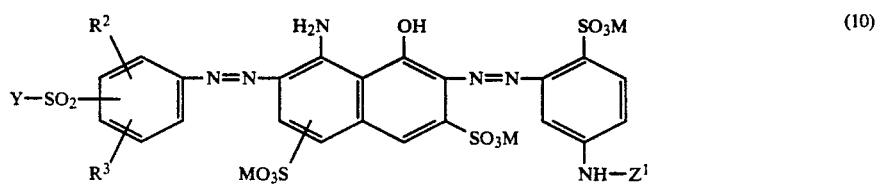

(10)

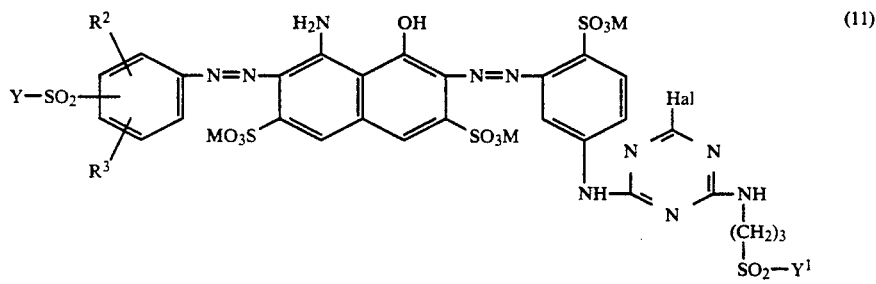

(11)

in which $R^2$ is a hydrogen atom or a sulfo, carboxy, methoxy, ethoxy or methyl group, $R^3$ is a hydrogen atom or a methoxy, ethoxy or methyl group, Y, M and $Z^1$ have one of the abovementioned particularly preferred meanings, Hal is a chlorine atom or preferably a fluorine atom and $Y^1$ denotes the vinyl group or the β-sulfatoethyl group, or preferably the β-chloroethyl group.

In the general formula (11), $R^2$ and $R^3$ preferably denote a hydrogen atom, and the group Y—SO$_2$— preferably represents the β-sulfatoethylsulfonyl group, and is preferably bonded to the benzene nucleus in the para-position relative to the azo group.

The present invention furthermore relates to processes for the preparation of the dyestuffs according to the invention. For example, they can be prepared according to the invention by procedures analogous to those known from the synthesis of disazo dyestuffs by reaction of dyestuff precursors with which the expert is familiar, at least one of these dyestuff precursors containing a fiber-reactive grouping of the general formula (4) or of the formula —SO$_2$—Y. Thus, for example, disazo dyestuffs of the general formula (1) can be synthesized by reaction of diazo and coupling components thereof in the diazotization and coupling procedure customary for these, the diazo and coupling components possessing a fiber-reactive group of the general formula (4) or of the formula —SO$_2$—Y or —SO$_2$—$Y^2$, in which $Y^2$ has one of the meanings of Y or is the $\beta$-hydroxyethyl group, and it also being possible for the diazo or coupling component already to contain the second azo grouping. Diazo components which can be employed according to the invention are the aromatic carbocyclic and heterocyclic amino compounds which are customary for fiber-reactive azo dyestuffs and which optionally contain the fiber-reactive group of the general formula (4) or $-SO_2-Y$ or $-SO_2-Y^2$, and coupling components which can be employed according to the invention are those coupling components which are customary for the synthesis of fiber-reactive azo dyestuffs, for example of the naphthol, aniline, naphthylamine, aminonaphthol, pyrazolone and pyridone series, and which possess the fiber-reactive group of the general formula $-SO_2-Y$ or $-SO_2-Y^2$ or of the general formula (4).

Such diazo components are, for example, compounds which correspond to the general formula $D^0-NH_2$ or $D^*-Z$ or $Y^2-SO_2-X^1-D^1-$ where $D^0$, $D^*$, Z, $Y^2$, $X^1$ and $D^1$ have the abovementioned meaning, and such coupling components are, for example, the compounds mentioned below of the general formulae (12a) to (12d) and (13a) to (13c)

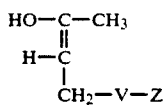
(12a)

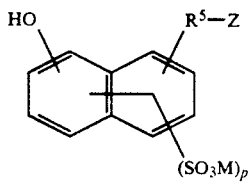
(12b)

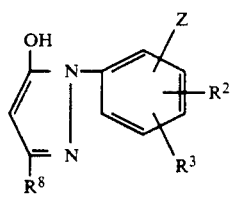
(12c)

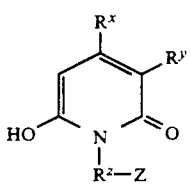
(12d)

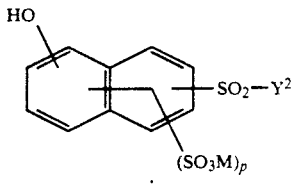
(13a)

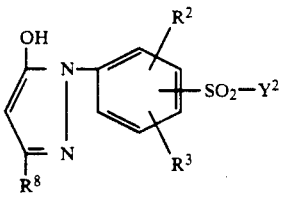
(13b)

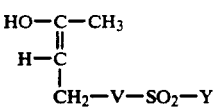
(13c)

where Z, Y, V, $R^5$, M, p, $R^2$, $R^3$, $R^8$, $R^x$, $R^y$ and $R^z$ have the abovementioned particularly preferred meanings.

Other diazo components which can be employed according to the invention for the synthesis of the dyestuffs of the general formula (1) are, for example, diamino compounds of the general formula $H_2N-D-NH_2$ or $H_2N-D^*-NH_2$, where D and $D^*$ have the abovementioned meaning, or monoacylamino derivatives thereof (the acyl group serving as the customary protective group, in order to exclude diazotization of the second amino group, which can then be split off hydrolytically in the customary manner after the diazotization and coupling). The aminoazo compounds obtainable with these diazo components can then be reacted according to the invention with a cyanuric halide or a compound of the general formula $Z^1-Hal$, in which $Z^1$ and Hal have the abovementioned meanings, by procedures analogous to those known for the reaction of amino compounds or aminoazo compounds with halogeno-triazine derivatives.

The diazotization and coupling reactions are carried out in the customary manner, and the diazotization is thus as a rule carried out at a temperature between $-5°$ C. and $+15°$ C. and a pH below 2 by means of a strong acid and alkali metal nitrite in a preferably aqueous medium, and the coupling reaction is thus as a rule carried out at a pH between 1.5 and 4.5 in the case of the coupling component containing amino groups and at a pH between 3 and 7.5 in the case of the coupling component containing hydroxyl groups, at a temperature between 0° and 25° C., likewise preferably in an aqueous medium.

The dyestuffs according to the invention can likewise be prepared according to the invention by reacting a cyanuric halide, such as cyanuric fluoride or cyanuric chloride, with a compound of the general formula (15)

(15)

in which A and $R^\alpha$ have the abovementioned meanings, and an amino compound of the general formula (16)

 (16)

in which Q has one of the abovementioned meanings, in any desired sequence. Thus, an amino compound of the general formula (15) can first be reacted with a cyanuric halide, such as cyanuric chloride or cyanuric fluoride, to give the halogenotriazinylamino compound of the general formula (17)

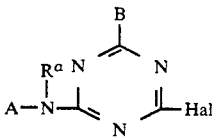

(17)

in which Hal, A, B and $R^a$ have the abovementioned meanings, and this is converted into the final dyestuff (1) by reaction with an equivalent amount of an amino compound of the general formula (16), or an amino compound of the general formula (16) is first reacted with a cyanuric halide to give the halogenotriazinylamino compound of the general formula (18)

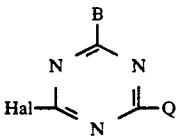

(18)

where Hal, B and Q have the abovementioned meanings, and an equivalent amount of this is reacted with the compound of the general formula (15) to give the final dyestuff (1). The condensation reactions between the cyanuric halide or the halogenotriazinylamino compounds (17) and (18) with the amino compounds (15) and/or (16) can be carried out in the customary manner of reaction of a cyanuric halide or a halogenotriazinylamino compound with amino compounds, that is to say in an organic or preferably aqueous-organic medium, particularly preferably in an aqueous medium, with addition of acid-binding agents, such as alkali metal or alkaline earth metal carbonates, alkali metal or alkaline earth metal bicarbonates or hydroxides or alkali metal acetates, the alkali metals and alkaline earth metals preferably being sodium, potassium or calcium. Tertiary amines, such as, for example, pyridine, triethylamine or quinoline, are likewise acid-binding agents. If these condensation reactions are carried out in an organic or aqueous-organic medium, the (portion of) organic solvent is acetone, dioxane or dimethylformamide.

The condensation reactions between the cyanuric halide and the amino compounds are as a rule carried out at a temperature between −10° C. and +70° C., preferably between −5° C. and +30° C., and at a pH between 1.5 and 12, preferably between 4.5 and 8. The reaction of the halogenotriazinylamino compounds of the general formulae (17) or (18) with an amino compound of the general formula (15) or (16) is carried out, for example, at a temperature between 0° C. and 70° C., preferably between 10° and 50° C., at a pH between 2 and 8, preferably between 4 and 7.

During the condensation reactions, it should be ensured that the fiber-reactive groupings are not damaged in the alkaline range.

The dyestuffs according to the invention which contain β-sulfatoethylsulfonyl or β-phosphatoethylsulfonyl groups the groups —SO₂—Y can also be prepared according to the invention by reacting a dyestuff of the general formula (1) having the above meaning, but in which one or more of the formula radicals Y, $Y^1$ and $Y^2$ represent a β-hydroxyethyl group, with a sulfating agent or phosphating agent, such as concentrated sulfuric acid and sulfuric acid containing sulfur trioxide or aqueous concentrated phosphoric acid and polyphosphoric acid, by procedures analogous to known procedures, the sulfation as a rule being carried out at a temperature between 10° C. and 25° C. and the phosphation at a temperature between 20° and 100° C.

The starting dyestuffs containing the β-hydroxyethylsulfonyl groups can be synthesized analogously to the above instructions for the preparation of the dyestuffs according to the invention, either by employing corresponding dyestuff precursors which contain this (these) β-hydroxyethylsulfonyl group(s), or by reacting an amino dyestuff of the general formula (15) and an amino compound of the general formula (16), in which Y, however, represents the β-hydroxyethyl group, with a cyanuric halide in accordance with the above reaction conditions.

Dyestuffs according to the invention corresponding to the general formula (1) in which one or more of the formula radicals Y, $Y^1$ and $Y^2$ represents a vinyl group can also be obtained according to the invention from dyestuffs corresponding to the general formula (1) in which at least one of the formula radicals Y, $Y^1$ and $Y^2$ denotes a β-sulfatoethyl or β-halogenoethyl group by converting the β-sulfatoethyl or β-halogenoethyl group into the vinyl group by treatment with an aqueous alkali, such as, for example, sodium bicarbonate or sodium hydroxide, in an aqueous medium at a temperature of 50° to 60° C. and a pH of 9 to 11.

The starting compounds of the general formula (16) are known, for example, from German Patent 2,614,550 and the abovementioned European Patent No. 0,076,782.

Aromatic amines corresponding to the general formula $(Y-SO_2-X^1-)_n-D-NH_2$ as diazo components in the mono— and disazo dyestuffs according to the invention or as starting compounds for the synthesis of these dyestuffs are, for example, 4-VS-aniline (VS here and below representing a group of the general formula $-SO_2-Y^2$, where $Y^2$ has the abovementioned meaning), 3-VS-aniline, 2-bromo-4-VS-aniline, 2-sulfo-5-VS-aniline, 2-sulfo-4-VS-aniline, 2-methoxy-5-VS-aniline, 2-methoxy-5-methyl-4-VS-aniline, 2,5-dimethoxy-4-VS-aniline, 2-hydroxy-5-VS-aniline, 4-chloro-3-VS-aniline, 2-chloro-5-VS-aniline, 3,4-di-VS-aniline, 2,5-di-VS-aniline, 4-(β-sulfatoethylamino)-3-VS-aniline, 2-(β-sulfatoethylamino)-5-VS-aniline, 4-(β-succinylamidoethylamino)-3-VS-aniline, 4-(3'-VS-benzoylamino)-aniline, 3-(3'-VS-benzoylamino)-aniline, 6-VS-2-naphthylamine, 8-VS-2-naphthylamine, 1-sulfo-6-VS-2-naphthylamine, 6-sulfo-8-VS-2-naphthylamine, 6-sulfo-8-VS-1-hydroxy-2-naphthylamine, 2-amino-4,4'-di-VS-diphenyl, 2-sulfo-5-[γ'-(β-chloroethylsulfonyl)-butyrylamino]-aniline, 2-sulfo-5-[γ-(vinylsulfonyl)-butyrylamino]-aniline, 2-sulfo-4-[γ-(β'-chloroethylsulfonyl)-butyrylamino]-aniline and 2-sulfo-4-[γ-(vinylsulfonyl)-butyrylamino]-aniline.

Starting compounds corresponding to the general formula $H_2N-D-NH_2$ or $H_2N-D^*-NH_2$ are, for example, 1,4-phenylenediamine, 1,4-phenylenediamine-2-sulfonic acid, 1,4-phenylenediamine, 1,4-phenylenediamine-2-sulfonic acid, 1,4-phenylenediamine-2-carboxylic acid, 1,4-diaminonaphthalene-2-sulfonic acid, 2,6-diamino-naphthalene-8-sulfonic acid, 2,6-diamino-naphthalene-4,8-disulfonic acid, 1,3-phenylenediamine, 1,3-phenylenediamine-4-sulfonic acid, 1,3-phenylenediamine-4,6-disulfonic acid, 1,4-phenylenediamine-2,6-disulfonic acid, 1,4-phenylenediamine-2,5-disulfonic acid, 1,4-diaminonaphthalene-6-sulfonic acid, 4,4'-diamino-diphenyl-3-sulfonic acid and 4,4'-diamino-stilbene-2,2'-disulfonic acid.

Starting compounds corresponding to the general formula H—E—NH$_2$ or H—E$^1$—NH$_2$, which can be employed for the synthesis of the disazo dyestuffs according to the invention and are used both as coupling components and then after the coupling as diazo components are, for example, aniline, 3-methyl-aniline, 2,5-dimethyl-aniline, 2,5-dimethoxyaniline, 3-methoxy-aniline, 3-acetylamino-aniline, 3-propionylamino-aniline, 3-butyrylamino-aniline, 3-benzoylamino-aniline, 3-ureido-aniline, 2-methyl-5-acetylaminoaniline, 2-methoxy-5-acetylamino-aniline, 2-methoxy-5-methylaniline, 1-aminonaphthalene-6-sulfonic acid, 1-aminonaphthalene-7-sulfonic acid, 2-sulfo-5-acetylaminoaniline, 2-amino-5-naphthol-7-sulfonic acid, 2-amino-8-naphthol-6-sulfonic acid, 2-(4-amino-benzoylamino)-5-naphthol-7-sulfonic acid, 1-(4'-amino-2-sulfo-phenyl)-3-methyl- or -3-carboxy-5-pyrazolone and N-(3-sulfo-4-amino)-acetoacet-anilide.

Starting compounds which can be used as coupling components corresponding to the general formula H—K$^1$—X$^2$—SO$_2$—Y$^2$ or H—K—X$^1$—SO$_2$—Y$^2$ for the synthesis of the dyestuffs according to the invention are, for example, 1-[4'-($\beta$-sulfatoethylsulfonyl)-phenyl]-3-methyl-5-pyrazolone, 1-[4'-(vinylsulfonyl)-phenyl]-3-methyl-5-pyrazolone, 1-[4'-(vinylsulfonyl)-phenyl]-3-carboxy-5-pyrazolone, 1-[3'-($\beta$-chloroethylsulfonyl)-benzoylamino]-3,6-disulfo-8-naphthol, 1-[3'-(vinylsulfonyl)-benzoylamino]-3,6-disulfo-8-naphthol, 1-[3'-(vinylsulfonyl)-benzoylamino]-4,6-disulfo-8-naphthol, 1-[3'-($\beta$-sulfatoethylsulfonyl)-benzoylamino]-4,6-disulfo-8-naphthol, 2-[3'-($\beta$-chloroethylsulfonyl)-benzoylamino]-6-sulfo-8-naphthol, 2-[3'-(vinylsulfonyl)-benzoylamino]-6-sulfo-8-naphthol, 3-[3'-($\beta$-chloroethylsulfonyl)-benzoylamino]-6-sulfo-8-naphthol, 3-[3'-(vinylsulfonyl)-benzoylamino]- 6-sulfo-8-naphthol, 2-[N-methyl-N-($\beta$-sulfatoethylsulfonyl)amino]-6-sulfo-8-naphthol, 3-[N-methyl-N-($\beta$-sulfatoethylsulfonyl)-amino]-6-sulfo-8-naphthol, 2-[N-ethyl-N-($\beta$-sulfatoethylsulfonyl)-amino]-6-sulfo-8-naphthol, 1-[N'-(3'-$\beta$-chloroethylsulfonyl-phenyl)-ureido]-3,6-disulfo-8-naphthol, 1-[N'-(3'-vinylsulfonyl-phenyl)-ureido]-3,6-disulfo-8-naphthol, 1-[N'-(3'-vinylsulfonylpropyl)-ureido]-3,6-disulfo-8-naphthol, 1-[N'-(3'-$\beta$-chloroethylsulfonyl-phenyl)-ureido]-4,6-disulfo-8-naphthol, 1-[N'-(3'-vinylsulfonyl-phenyl)-ureido]-4,6-disulfo-8-naphthol, 1-[N'-(3'-$\beta$-chloroethylsulfonyl-propyl)-ureido]-4,6-disulfo-8-naphthol, 2-[N'-(3'-$\beta$-sulfatoethylsulfonylphenyl)-ureido]-6-sulfo-8-naphthol, 2-[N'-(3'-$\beta$-chloroethylsulfonyl-propyl)-ureido]-6-sulfo-8-naphthol, 3-[N'-(3'-$\beta$-chloroethylsulfonylphenyl)-ureido]-6-sulfo-8-naphthol, 3-[N'-(3'-vinylsulfonyl-propyl)-ureido]-6-sulfo-8-naphthol, 2-sulfo-5-[N'-(3''-$\beta$-chloroethylsulfonyl)-phenyl]-ureido-aniline and 3-[N'-(3''-$\beta$-sulfatoethylsulfonyl)-phenyl]-ureido-aniline.

Coupling components corresponding to the general formula H—K—NHR$^\alpha$ or H—K*—NHR$^\alpha$ which are used for building up the azo dyestuffs according to the invention in which the fiber-reactive radical of the general formula (4) is contained in the coupling component, in the amino group —NHR$^\alpha$ of which this fiber-reactive radical can then be introduced, are, for example, aniline, 3-methyl-aniline, 2,5-dimethyl-aniline, 2,5-dimethoxyaniline, 3-methoxyaniline, 3-acetylamino-aniline, 3-propionylamino-aniline, 3-butyrylamino-aniline, 3-benzoylamino-aniline, 3-ureidoaniline, 2-methyl-5-acetylamino-aniline, 2-methoxy-5-acetylamino-aniline, 2-methoxy-5-methyl-aniline, 1-aminonaphthalene-6-sulfonic acid or -7-sulfonic acid, 1-aminonaphthalene-8-sulfonic acid, 2-sulfo-5-acetylaminoaniline, 2-amino-5-naphthol-7-sulfonic acid, 2-amino-8-naphthol- 6-sulfonic acid, 2-(4'-aminobenzoyl-amino)-5-naphthol-7-sulfonic acid, 1-(4'-amino- or 1-(4'-acetylamino-2-sulfophenyl)-methyl- or -3-carboxy-5-pyrazolone, N-(3-sulfo-4-amino)-acetoacet-anilide, 1-amino-8-naphthol-3,6- or -4,6-disulfonic acid, 1-(3'- or 1-(4'-aminobenzoyl)-amino-8-naphthol-3,6- or -4,6-disulfonic acid, 1-acetylamino-8-naphthol-3,6- or -4,6-disulfonic acid, 2-acetylamino-5-naphthol-7-sulfonic acid, 2-acetylamino-8-naphthol-6-sulfonic acid, 3-acetylamino-8-naphthol-6-sulfonic acid, 3-(N-methylamino)-8-naphthol-6-sulfonic acid, 1-(3'-amino- or 1-(3'-acetylamino-6'-sulfophenyl)-3-methyl- or -3-carboxy-5-pyrazolone, 2-(N-methyl-N-acetylamino)- or 2-methylamino-5-naphthol-7-sulfonic acid, N-methyl-aniline and N-propyl-m-toluidine.

Starting compounds corresponding to the general formula (16) are, for example, $\gamma$-($\beta$'-chloroethylsulfonyl)-propylamine, $\gamma$-($\beta$'-sulfatoethylsulfonyl)-propylamine, $\gamma$-($\beta$'-hydroxyethylsulfonyl)-propylamine, $\gamma$-(vinylsulfonyl)-propylamine, N-ethyl-$\gamma$-($\beta$'-chloroethylsulfonyl)-propylamine, N-ethyl-$\gamma$-($\beta$'-sulfatoethylsulfonyl)-propylamine, N-ethyl-$\gamma$-($\beta$'-hydroxyethylsulfonyl)-propylamine and N-ehtyl-$\gamma$-($\beta$'-vinylsulfonyl)-propylamine as well as 4-($\beta$-sulfatoethylsulfonyl)-piperidine, 4-(vinylsulfonyl)-piperidine, N'-[$\gamma$-($\beta$'-chloroethylsulfonyl)-propyl]-piperazine, 2-[$\beta$-($\beta$'-chloroethylsulfonyl)-ethyl]-piperidine and 3-[($\beta$-sulfatoethylsulfonyl)-methyl]-piperidine.

Bivalent coupling components which are suitable for building up such disazo dyestuffs in which the bivalent coupling radical is bonded to two diazo components, one of which contains a fiber-reactive radical of the general formula Y—SO$_2$—X$^1$— and the other of which contains a fiber-reactive radical of the general formula (4) are, for example, resorcinol, 5,5'-dihydroxy-7,7'-disulfo-2,2'-dinaphthylurea and, in particular, 1-amino-8-naphthol-3,6-disulfonic acid and 1-amino-8-naphthol-4,6-disulfonic acid.

The dyestuffs according to the invention corresponding to the general formula (1) are suitable as fiber-reactive dyestuffs for dyeing and printing fibers containing hydroxy groups, such as cellulose fiber materials, in particular cotton, and likewise for synthetic or naturally occurring polyamide fibers, such as wool. Suitable dyeing processes are the known dyeing and printing processes for fiber-reactive dyestuffs, in particular those for fiber-reactive dyestuffs which contain a combination of the fiber-reactive groups of the fluorotriazine and vinylsulfone series. Such procedures are described in numerous instances in the general literature and patent literature, thus, for example, in the above-mentioned patent application publications.

The dyestuffs according to the invention can advantageously be used in particular in the cold pad-batch method, since they are distinguished by a uniformly high fixing yield. Their use for dyeing by the customary exhaustion processes, and moreover by the one-bath pad-steam method, the two-bath pad-batch method and the two-bath pad-steam method is also advantageous. They also exhibit uniformly high fixing yields in printing processes, regardless of the type of fixing, which can be effected, for example, by steaming or in dry heat. The dyeings and prints obtainable according to the invention are of high brilliance and good depth of color. They exhibit good light-fastness, including in the wet state, and good wet-fastness, such as good fastness during washing at 60° C. and 95° C. and good fastness to seawater, acid and alkaline perspiration and chlorinated water, and moreover good fastness to peroxide and fastness to exhaust gases. The dyestuffs are furthermore distinguished by insensitivity towards atmospheric influences. They moreover produce good dyeings on polyamide fiber materials, such as wool, in which case their good light-fastness and in particular their good fastnesses to washing and perspiration can be singled out in particular.

The following Examples serve to illustrate the invention. The parts mentioned therein are parts by weight and the percentage data are percentages by weight, unless noted otherwise. Parts by weight bear the same relationship to parts by volume as the kilogram to the liter. The compounds described by their formulae in the Examples are stated in the form of the free acids; they are in general prepared and isolated in the form of their sodium or potassium salts and used for dyeing in the form of their salts. The starting compounds and components mentioned in the form of the free acid in the following Examples, in particular the Tabular Examples, can likewise be employed in the synthesis as such or in the form of their salts, preferably alkali metal salts.

The absorption maxima ($\lambda_{max}$) in the visible range stated for the compounds according to the invention were determined with the aid of the alkali metal salts thereof in aqueous solution. In the Table Examples, the $\lambda_{max}$ values are in brackets alongside the color shade; the wavelengths stated relate to nm.

EXAMPLE 1

A sulfuric acid, aqueous diazonium salt suspension, prepared in the customary manner, of 41.4 parts of 2-sulfo-5-acetylamino-aniline is added to a solution, of pH 5, of 107 parts of the compound 1-amino-8-hydroxy-3,6-disulfo-2-[4'-(β-sulfatoethylsulfonyl-phenyl)]-azo-naphthalene. The coupling reaction is carried out at a pH of 6 to 7 and a temperature of about 10° C. When the coupling has ended, the disazo compound obtained is salted out by means of about 180 parts of potassium chloride and isolated.

132 parts of this disazo compound are heated in a mixture of 500 parts of water and 100 parts of 95% strength sulfuric acid at 95° to 100° C. for one hour for the purpose of hydrolysis of the acetylamino group. The batch is then cooled to 25° C. and the disazo compound which has precipitated is filtered off, washed with 200 parts of water and dried under reduced pressure.

116 parts of this disazo compound are introduced into 50 parts of 100% strength sulfuric acid at 10° to 20° C. The batch is subsequently stirred at 20° to 25° C. for a further 20 hours and then poured onto a mixture of 750 parts of ice, 100 parts of water and 160 parts of sodium chloride. The disazo compound salted out, which corresponds to the formula (written in the form of the free acid)

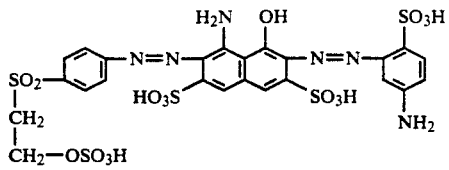

is isolated and dried under reduced pressure.

81 parts of this disazo compound are dissolved in 500 parts of water. 100 parts of ice are added to the solution, and 15 parts of cyanuric fluoride are then added, whilst maintaining a pH between 5.0 and 5.5 and a temperature of 0° to 5° C. After addition of 26.7 parts of 3-(β-chloroethylsulfonyl)-propylamine hydrochloride, the second condensation reaction is carried out at a temperature of 0° to 5° C. and a pH of 6.0 to 6.5.

After addition of one part of disodium hydrogen phosphate and 3 parts of sodium dihydrogen phosphate, the disazo compound according to the invention is isolated by evaporation of the synthesis solution, such as, for example, by spray drying. The alkali metal salt (sodium salt) of the compound of the formula

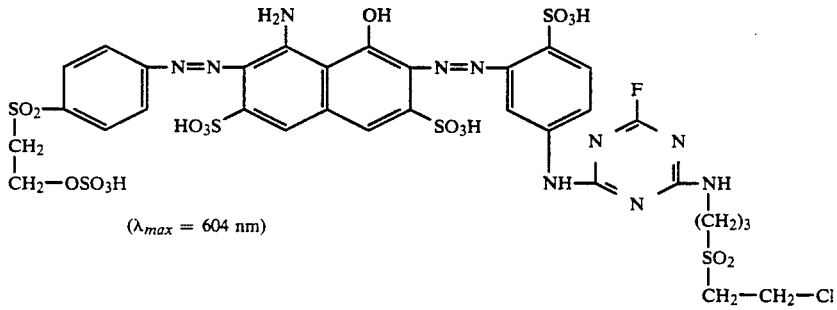

($\lambda_{max}$ = 604 nm)

is obtained in the form of a powder containing electrolyte salts. The disazo compound according to the invention has very good fiber-reactive dyestuff properties and dyes the materials mentioned in the description, in particular cellulose fiber materials, such as cotton, in navy blue shades of good fastness properties, of which the fastness to chlorinated water may be emphasized in particular, by the dyeing and printing processes customary in the art for fiber-reactive dyestuffs.

EXAMPLE 2

A solution of 19.8 parts of 1,3-diaminobenzene-4-sulfonic acid in 100 parts of water and 12.9 parts of a 33% strength aqueous sodium hydroxide solution is slowly added to a suspension of 19.7 parts of cyanuric chloride in 50 parts of water and 85 parts of ice at 5° to 10° C. in the course of 30 minutes. The pH is brought to 4.0 to 4.5 by means of sodium carbonate and the batch is subsequently stirred at 8° to 10° C. for a further hour.

The resulting suspension of the 2-sulfo-5-(dichloro-triazinyl)-amino-aniline compound is mixed with 6.9 parts of sodium nitrite and 100 parts of ice and diazotized by means of 68.4 parts of 20% strength aqueous sulfuric acid at 0° to 5° C. The resulting diazonium salt suspension is added to about 600 parts of an aqueous solution of 53 parts of the compound 1-amino-8-hydroxy-3,6-disulfo-2-[4'-(β-sulfatoethylsulfonyl)-phenyl]-azo-napht-halene at 10° to 15° C. and at pH 6.0 to 6.5. The coupling reaction is carried out while maintaining this pH, 24.5 parts of 3-(β-chloroethylsulfonyl)-propylamine hydrochloride are then added and the condensation reaction is carried out at a pH of 6.0 to 6.5 and a temperature of 40° to 45° C. for one hour.

The compound according to the invention corresponding to the formula is obtained as the alkali metal salt (sodium salt). It has good dyestuff properties and dyes, for example, cotton in fast navy blue shades.

EXAMPLE 4

89 parts of the starting disazo compound 1-amino-8-hydroxy-3,6-disulfo-2-[2'-sulfo-4'-(β-hydroxyethylsulfonyl)-phenyl]-azo-7-(2"-sulfo-5"-amino-phenyl)-azo-naphthalene are stirred into 280 parts of 100% strength sulfuric acid at 20° to 25° C. The batch is subsequently

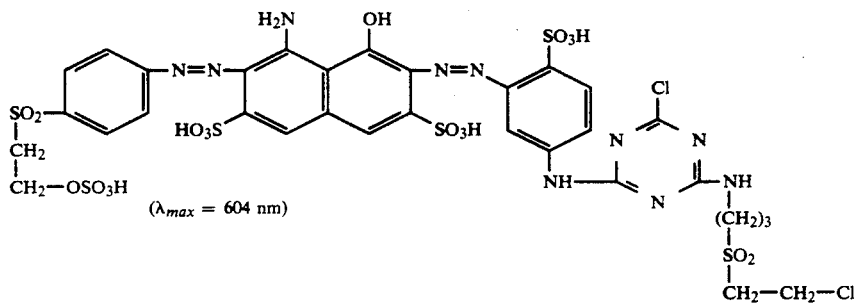

($\lambda_{max}$ = 604 nm)

is isolated as the alkali metal salt (sodium salt) in the form of a black powder containing electrolytes. The compound according to the invention exhibits very good dyestuff properties and produces navy blue dyeings and prints having good fastness properties, of which the fastness to chlorinated water may be particularly emphasized, on the materials mentioned in the description, such as, in particular, cellulose fiber materials.

EXAMPLE 3

The procedure is analogous to Example 1 from the starting compound 1-amino-8-hydroxy-3,6-disulfo-2-[3'-(β-sulfatoethylsulfonyl)-phenyl]-azo-7-(2"-sulfo-5"-aminophenyl)-azo-naphthalene, and this is reacted with the equivalent amount of cyanuric chloride and 3-(β-chloroethylsulfonyl)-propylamine hydrochloride in accordance with the instructions of Example 2. The compound according to the invention of the formula stirred at 20° C. for a further 20 hours and is then poured into a mixture of 50 parts of water and 450 parts of ice. The excess sulfuric acid is then precipitated by means of 300 parts of calcium carbonate and the solution is brought to a pH of 5.8 to 6 by means of 6 parts of sodium carbonate, heated to 40° C. and filtered. The residue is washed with 200 parts of water and the combined filtrates are evaporated.

The resulting disazo compound containing the β-sulfatoethylsulfonyl group is dissolved in 400 parts of water. 100 parts of ice are added and the compound is reacted with 15 parts of cyanuric fluoride at 0° to 5° C. and pH 5 to 6, the mixture is then subsequently stirred for a further period, 26.7 parts of 3-(β-chloroethylsulfonyl)-propylamine hydrochloride are then added and the condensation reaction is carried out at a pH of 6.0 to 6.5 and a temperature of 40° to 45° C. for about 3 hours.

The compound according to the invention of the formula

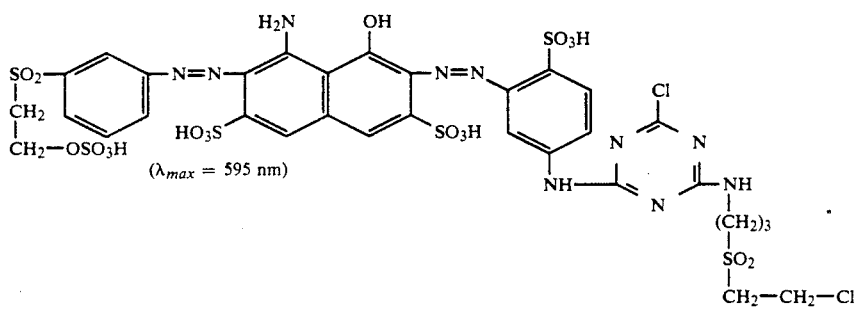

($\lambda_{max}$ = 595 nm)

(λ_max = 623 nm)

is isolated in the form of the alkali metal salt (sodium salt). The compound according to the invention has very good dyestuff properties and produces navy blue dyeings and prints with good fastness properties on the materials mentioned in the description, such as, for example, cellulose fiber materials, under the use conditions customary for fiber-reactive dyestuffs.

We claim:

1. A diszao dyestuff of the formula $$Y-SO_2-X^1-D^1-N=N-E^1-N=N-K^*-Z$$

in which:

Y is vinyl, β-sulfatoethyl, β-halogenoethyl, β-thiosulfatoethyl, β-phosphatoethyl or β-acetoxyethyl;

$X^1$ is a direct bond or alkylene or 1 to 4 carbons or is a group of the formula $-(C_1-C_4\text{-alkyl})-CO-NH-$;

Z is a group of the formula in which $R^a$, B, and Q are defined as follows:

$R^a$ is hydrogen or straight-chain or branched alkyl having 1 to 4 carbon atoms unsubstituted or substituted by a carboxy, sulfo, cyano, or hydroxy or by a chlorine;

B is fluorine, chlorine, bromine, alkylsulfonyl having 1 to 4 carbon atoms phenylsulfonyl, methoxy or sulfo;

Q is a group of the formula (2a)

$$-N\begin{matrix}R\\(CH_2)_3-SO_2-Y\end{matrix} \quad (2a)$$

in which Y is a said Y defined above, and R is hydrogen or alkyl having 1 to 4 carbon atoms;

$D^1$ is phenylene substituted by the substituents $R^2$ and $R^3$, $R^2$ being hydrogen, methyl, ethyl, methoxy, ethoxy, alkanoyl of 2 to 5 carbons, cyano, carboxy, sulfo, alkoxycarbonyl of 2 to 5 carbons, carbamoyl, N-($C_1-C_4$-alkyl)-carbamoyl, fluorine, chlorine, bromine or trifluoromethyl, and $R^3$ being hydrogen, methyl, ethyl, methoxy, ethoxy, cyano, carboxy, sulfo, alkanoylamino of 2 to 5 carbons, alkoxycarbonyl of 2 to 5 carbons, carbamoyl, N-($C_1-C_4$-alkyl)-carbamoyl, fluorine, chlorine, nitro, sulfamoyl, N-($C_1-C_4$-alkyl)-sulfamoyl, alkylsulfonyl of 1 to 4 carbons, phenylsulfonyl or phenoxy, or $D^1$ is naphthylene unsubstituted or substituted by 1 or 2 sulfo;

$E^1$ is a group of the formula in which $R^2$ is a said $R^2$ as defined above and $R^3$ is a said $R^3$ as defined above;

M is hydrogen or an alkali metal;

p is the number zero, 1, or 2; in the case where p is zero, the group taken p times is hydrogen;

$R^4$ is hydrogen, alkyl of 1 to 4 carbons, alkoxy of 1 to 4 carbons, chlorine, alkanoylamino of 2 to 5 carbons, benzoylamino, ureido, N'-phenyl-ureido, N'-alkyl-ureido with an alkyl moiety of 1 to 4 carbon atoms, phenylsulfonyl or alkylsulfonyl of 1 to 4 carbons;

m is the number 1 or 2;

$R^8$ is hydrogen, alkyl of 1 to 4 carbons, cyano, carboxy, carbalkoxy of 2 to 5 carbons, carboxamido or phenyl;

$-K^*-Z$ is a group of the formula

-continued

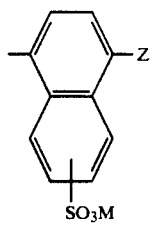

(8c)

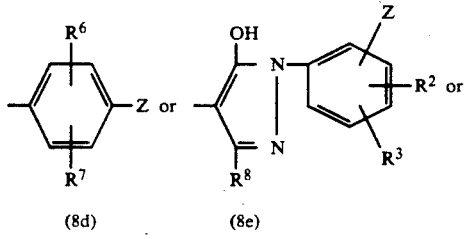

(8d)  (8e)

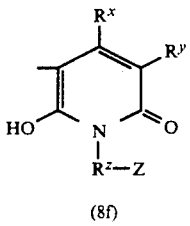

(8f)

in which $R^2$, $R^3$, M, p and Z are each a said $R^2$, $R^3$, M, p and Z as defined above, and the hydroxy group in formula (8b) is in the ortho-position relative to the free bond bonded to the azo group;

V is phenylene substituted by a said $R^2$ and $R^3$ defined above, or

V is naphthylene unsubstituted or substituted by 1 or 2 sulfo;

$R^5$ is a direct bond or a group of the formula —NH—CO—phenylene, —NH—CO—NH—phenylene, —N(CH$_3$)—CO—phenylene— or —N(CH$_3$)—CO—NH—phenylene—;

$R^6$ is hydrogen, alkyl of 1 to 4 carbons, alkoxy of 1 to 4 carbons, bromine, chlorine, or alkanoylamino of 2 to 7 carbons;

$R^7$ is hydrogen, alkyl of 1 to 4 carbons, alkoxy of 1 to 4 carbons, chlorine, alkanoylamino of 2 to 7 carbons, ureido or phenylureido;

$R^8$ is a said $R^8$ as defined above;

$R^x$ is hydrogen, alkyl of 1 to 4 carbons, alkyl of 1 to 4 carbons substituted by alkoxy of 1 to 4 carbons or by cyano;

$R^y$ is hydrogen, sulfo, sulfoalkyl with an alkyl moiety of 1 to 4 carbons, cyano or carbamoyl;

$R^z$ is alkylene of 1 to 6 carbons, phenylene, phenylene substituted by substituents selected from the group consisting of methyl, ethyl, chlorine, carboxy and sulfo, or is alkylenephenylene having 2 to 4 carbons in the alkylene moiety.

2. A disazo dyestuff of the formula $$Z-D^*-N=N-E^1-N=N-K^1-X^2-SO_2-Y$$

in which:

Z is a group of the formula

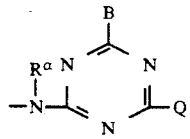

in which $R^{60}$, B, and Q are defined as follows:

$R^a$ is hydrogen or straight-chain or branched alkyl having 1 to 4 carbon atoms unsubstituted or substituted by a carboxy, sulfo, cyano, or hydroxy or by a chlorine;

B is fluorine, chlorine, bromine, alkylsulfonyl having 1 to 4 carbon atoms, phenylsulfonyl, methoxy or sulfo;

Q is a group of the formula (2a)

in which Y is vinyl, β-sulfatoethyl, β-halogenoethyl, β-thiosulfatoethyl, β-phosphatoethyl or β-acetoxyethyl, and R is hydrogen or alkyl having 1 to 4 carbon atoms;

D* is phenylene unsubstituted or substituted by 1 or 2 substituents selected from the group consisting of hydrogen, methyl, ethyl, methoxy, bromine, chlorine, carboxy and sulfo, or is naphthylene unsubstituted or substituted by 1 or 2 sulfo;

$E^1$ is a group of the formula

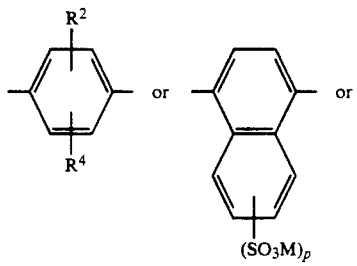

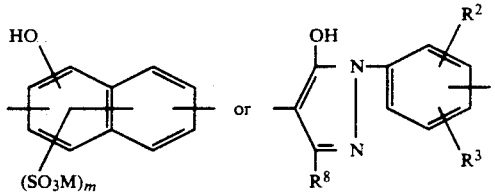

in which:

$R^2$ is hydrogen, methyl, ethyl, methoxy, ethoxy, alkanoyl of 2 to 5 carbons, cyano, carboxy, sulfo, alkoxycarbonyl of 2 to 5 carbons, carbamoyl, N-(C$_1$–C$_4$-alkyl)-carbamoyl, fluorine, chlorine, or trifluoromethyl, $R^3$ is hydrogen, methyl, ethyl, methoxy, ethoxy, cyano, carboxy, sulfo, alkanoylamino of 2 to 5 carbons, alkoxycarbonyl of 2 to 5 carbons, carbamoyl, N-(C$_1$–C$_4$-alkyl)-carbamoyl, fluorine, chlorine, nitro, sulfamoyl, N-(C$_1$–C$_4$-alkyl)-sulfamoyl, alkylsulfonyl of 1 to 4 carbons; phenylsulfonyl or phenoxy, M is hydrogen or an alkali metal;

p is the number zero, 1, or 2;
in the case shere p is zero, the group taken p times is hydrogen;
$R^4$ is hydrogen, alkyl of 1 to 4 carbons, alkoxy of 1 to 4 carbons, chlorine, alkanoylamino of 2 to 5 carbons, benzoylamino. ureido, N'-phenyl-ureido, N'-alkyl-ureido with an alkyl moiety of 1 to 4 carbons, phenylsulfonyl or alkylsulfonyl of 1 to 4 carbons;
m is the number 1 or 2;
$R^8$ is hydrogen, alkyl of 1 to 4 carbons, cyano, carboxy, carbalkoxy of 2 to 5 carbons, carboxamido or phenyl;
$K^1$ is a group of the formula

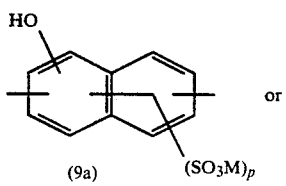

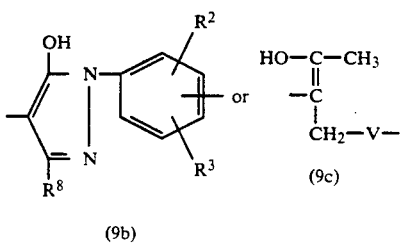

in which:

M, p, $R^8$, $R^2$, and $R^3$ are each a said M, p, $R^8$, $R^2$, and $R^3$ as defined above, and the hydroxy group in formula (9a) is in the ortho-position relative to the free bond bonded to the azo group;
V is phenylene substituted by a said $R^2$ and $R^3$ defined above, or is naphthylene unsubstituted or substituted by 1 or 2 sulfo;
$X^2$ is a direct bond, alkylene of 1 to 4 carbons or a group of the formula —NH—CO—($C_1$-$C_4$-alkyl)—;
Y is a said Y as defined above in the definition of formula (2a).

3. A dyestuff as claimed in claim 1, in which Z is a group of the formula —NH—$Z^1$, in which $Z^1$ is a group of the formula (4a)

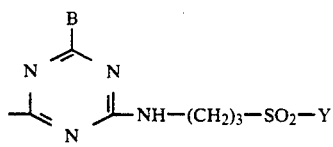

in which

B is fluorine, chlorine, bromine, alkylsulfonyl having 1 to 4 carbon atoms, phenylsulfonyl, methoxy or sulfo and
Y is vinyl, β-sulfatoethyl, β-halogenoethyl, β-thiosulfatoethyl, β-phosphatoethyl or β-acetoxyethyl.

4. A dyestuff as claimed in claim 3, in which B is chlorine or fluorine.

5. A dyestuff as claimed in claim 2, in which z is a group of the formula —NH—$Z^1$, in which $Z^1$ is a group of the formula (4a)

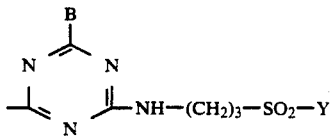

in which

B is fluorine, chlorine, bromine, alkylsulfonyl having 1 to 4 carbon atoms, phenylsulfonyl, methoxy or sulfo and
Y is vinyl, β-sulfatoethyl, β-halogenoethyl, β-thiosulfatoethyl, β-phosphatoethyl or β-acetoxyethyl.

6. A dyestuff as claimed in claim 5, in which B is chlorine or fluorine.

7. A dyestuff as claimed in claim 3, in which Y in said formula (4a) is β-sulfatoethyl or β-chloroethyl.

8. a dyestuff as claimed in claim 4, in which Y in said formula (4a) is β-sulfatoethyl or β-chloroethyl.

9. A dyestuff as claimed in claim 5, in which Y in said formula (4a) is β-sulfatoethyl or β-chloroethyl.

10. A dyestuff as claimed in claim 6, in which Y in said formula (4a) is β-sulfatoethyl or β-chloroethyl.

11. A dyestuff as claimed in claim 1, in which Y is β-sulfatoethyl or β-chloroethyl.

12. A dyestuff as claimed in claim 2, in which Y is β-sulfatoethyl or β-chloroethyl.

13. A dyestuff as claimed in claim 1, in which Y is vinyl.

14. A dyestuff as claimed in claim 2, in which Y is vinyl.

* * * * *

UNITED STATES PATENT AND TRADEMARK OFFICE
CERTIFICATE OF CORRECTION

PATENT NO. : 5,243,034

DATED : September 7, 1993

INVENTOR(S) : Horst Tappe, Dieter Oehme, Holger M. Büch and Werner H. Russ

It is certified that error appears in the above-indentified patent and that said Letters Patent is hereby corrected as shown below:

At col. 12, line 52

"2-sulfo-5-[γ'-(B-chlorethylsulfonyl)-" should read
--2-sulfo-5-[γ-(B'-chloroethylsulfonyl)---.

At col. 14, line 26
"N-ehtyl-γ-(B'-vinyl-" should read
--N-ethyl-γ-(B'-vinyl- --, In claim 1, at col. 19, line 22
"diszao" should read --disazo--.

In claim 1 at col 19, line 29
"alkylene or 1" should read --alkylene of 1--.

In claim 1 at col. 19, line 47
Insert a "," after "atoms".

In claim 2 at col. 22, line 9
"$R^{60}$" should read --$R^{\alpha}$--.

In claim 2 at col. 22, line 59
after "chlorine," insert --bromine--.

UNITED STATES PATENT AND TRADEMARK OFFICE
CERTIFICATE OF CORRECTION

PATENT NO. : 5,243,034

DATED : September 7, 1993

INVENTOR(S) : Horst Tappe, Dieter Oehme, Holger M. Büch and Werner H. Russ

It is certified that error appears in the above-indentified patent and that said Letters Patent is hereby corrected as shown below:

In claim 2 at col. 23, line 2
"shere" should read --where--.

Signed and Sealed this

Thirty-first Day of May, 1994

Attest:

BRUCE LEHMAN

Attesting Officer     Commissioner of Patents and Trademarks